United States Patent [19]

Atkinson et al.

[11] 3,917,729
[45] Nov. 4, 1975

[54] PROCESS FOR DEUTERATING BROMIDE DERIVATIVES

[75] Inventors: Joseph G. Atkinson, Montreal; Patrice Belanger, Dollard Des Ormeaux, both of Canada

[73] Assignee: Charles E. Frosst & Co., Canada

[22] Filed: Feb. 7, 1974

[21] Appl. No.: 440,616

Related U.S. Application Data

[63] Continuation of Ser. No. 121,124, Aug. 4, 1971, abandoned.

[52] U.S. Cl...... 260/658 R; 260/648 R; 260/648 C; 260/663; 260/657; 260/651 R
[51] Int. Cl.$^2$ ................. C07C 17/00; C07C 19/00; C07C 23/00
[58] Field of Search ........ 260/648 R, 648 C, 651 R, 260/663, 657, 658 R, 652 R

[56] References Cited
OTHER PUBLICATIONS
Calf et al., Australian Journal of Chemistry, 21, 947–960, (1968).

Hammond et al., J. Am. Chem. Soc., 83, 2554, (1961).

*Primary Examiner*—D. Horwitz
*Attorney, Agent, or Firm*—Thomas E. Arther; Harry E. Westlake, Jr.

[57] ABSTRACT

The invention relates to a process wherein a mixture comprising a secondary or tertiary acyclic bromide or an alicyclic bromide, deuteriobromic acid and deuterium oxide is permitted to react for sufficient time to provide an equilibrium in the exchange of the hydrogens of the secondary or tertiary acyclic bromide or the alicyclic bromide by deuterium atoms.

3 Claims, No Drawings

PROCESS FOR DEUTERATING BROMIDE DERIVATIVES

This is a continuation of application Ser. No. 121,124, filed Aug. 4, 1971, and now abandoned.

This invention is concerned with the exchange of hydrogen atoms by deuterium atoms in secondary and tertiary acyclic and alicyclic bromides.

No procedure has previously been reported for the replacement of hydrogen atoms by deuterium atoms in alkyl bromides. It was found as a feature of this invention that upon refluxing an acyclic or alicyclic bromide in a solution of deuteriobromic acid (DBr) in deuterium oxide ($D_2O$) all of the hydrogens in the starting substance are replaced or exchanged by deuterium atoms. Advantageously, the acyclic or alicyclic bromide is admixed with a solution of DBr in $D_2O$ wherein the DBr concentration is at least 10%. Conditions for maximum exchange are dependent upon the amount of DBr employed, temperature and duration of reaction. When a low concentration, such as 10% DBr, is employed a longer reaction time and a higher temperature are required to attain equilibrium in the incorporation of deuterium.

Temperatures from 0°C. to about 175°C. can be employed though lower temperatures will require longer times to reach equilibrium. Lower temperatures, however, are sometimes preferred to ensure that skeletal rearrangements do not occur. These situations would be recognized by workers in this art.

Reaction periods of from about 2 to 24 hours can be employed for the exchange, the other conditions being varied in the manner discussed above.

Optimum conditions for attaining equilibrium in the incorporation of deuterium in cyclopentyl bromide involve the use of at least a 40% concentration of DBr in $D_2O$ and conducting the exchange reaction under reflux conditions for at least 18 hours. Shorter periods of time provide a high percent deuteration if the alkyl bromide is more reactive than cyclopentyl bromide and, conversely, longer periods would be required should the alkyl bromide be less reactive.

If it is found that the product is not completely deuterated, repetition of this exchange 2 or more times leads to fully deuterated product (deuterium content greater than 98% D).

Any commercially available secondary or tertiary acyclic bromide or alicyclic bromide compound can be used as starting material in the novel process of this invention, or when not available it can be prepared, advantageously in situ, from any precursor which in the presence of HBr or DBr forms a secondary or tertiary acyclic or alicyclic bromide. Suitable precursors are acyclic or alicyclic compounds having a hydroxyl group attached to a secondary or tertiary carbon atom or an olefinic acyclic or alicyclic compound. Either the alcoholic or olefinic type compounds when treated with HBr or DBr provides the desired secondary or tertiary acyclic or alicyclic bromide. The secondary or tertiary acyclic or alicyclic bromide or its precursor optionally can be substituted with one or more acyclic, alicyclic and/or aromatic group(s); the only critical requirement being that the bromide atom is or becomes attached to a secondary or tertiary carbon atom.

The reaction scheme of the novel process of this invention can thus be illustrated as follows:

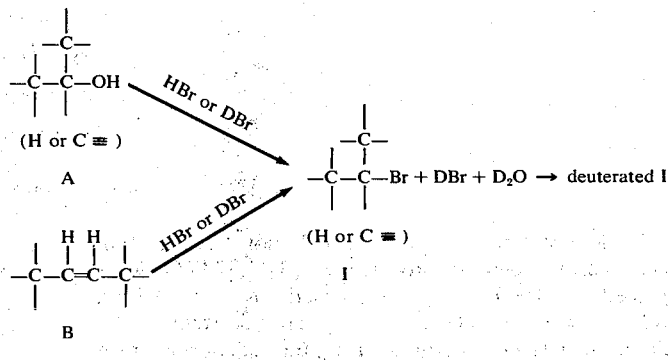

The deuterated compounds I (i.e. the deuterated secondary or tertiary acyclic or alicyclic bromide compounds) are novel compounds and are useful as intermediates for the preparation of a variety of deuterated compounds that can be employed as tracer products. For example, DBr can readily be removed from deuterated product I to give rise to olefins which then can react, for example, with diborane, meta-chloroperbenzoic acid or bromine to give alcohols, epoxides, dibromo compounds or with oxidizing agents such as nitric acid or potassium permanganate to give acids.

The deuterated acyclic or alicyclic bromides also can readily be converted by alcoholysis to their corresponding alcohols or they can be converted by trimethylamine oxide to the corresponding ketone. The alcohols and ketones prepared from the deuterated products of this invention are useful as intermediates.

The deuterated acyclic and alicyclic bromide compounds additionally have utility in mass spectral work for determination of fragmentation patterns as well as for reaction and mechanism studies.

The following examples are provided to illustrate the novel process of this invention and to provide illustrative examples of deuterated acyclic and alicyclic bromide compounds that can be prepared. It will be understood that an infinite number of additional secondary or tertiary acyclic or alicyclic bromides can be deuterated by the process of this invention to provide the corresponding fully or partially deuterated end product. However, as the conditions employed for the preparation of these additional deuterated secondary or tertiary acyclic or alicyclic bromide compounds would be the same as the provide in the following examples, further illustrative examples are not considered essential in order that they be considered as falling within the scope of this invention.

REPLACEMENT OF HYDROGEN BY DEUTERIUM IN A SECONDARY ALICYCLIC BROMIDE

EXAMPLE 1

Preparation of cyclopentyl-$d_9$ bromide

Cyclopentyl bromide (15 g.; 0.1 mole) and 20 ml. concentrated deuteriobromic acid (44% in $D_2O$) were placed in a 100 ml. round-bottomed flask fitted with a reflux condenser. The 2-phase system was refluxed for 20 hours with continuous stirring, the reaction mixture then cooled, the organic layer decanted and the aqueous layer extracted with ether. The ether extract then was washed several times with 5% sodium bicarbonate solution and with saline solution and the organic layers obtained mixed and dried over calcium chloride. The dried organic solution was concentrated and the residue obtained analyzed by nuclear magnetic resonance spectroscopy for isotopic content. The residue, deuterated cyclopentyl bromide, was found to be 70 atom % D, yield 14.2 g.

The residue was subjected to three more exchanges by reaction with 20 ml. concentrated deuteriobromic acid (44% in $D_2O$) as described above. Upon distillation of the reaction mixture, 2.5 g. of cyclopentyl-$d_9$ bromide, (99 atom % D) was obtained.

The above reaction was repeated using 50 g. of cyclopentyl bromide and 70 ml. of concentrated deuteriobromic acid (44% in $D_2O$). There was obtained 31 g. of cyclopentyl-$d_9$ bromide (99.2 atom % D).

By replacing the cyclopentyl bromide employed in Example 1 by an equivalent quantity of the cyclic bromide identified in the following table and following substantially the same procedure described in Example 1, the corresponding deuterated alicyclic bromides were obtained:

TABLE I

Exchange of Alkyl Bromides

| Ex. No. | Bromide | No. of Exch. | Product | Atom % D | Yield % | Purity % |
|---|---|---|---|---|---|---|
| 2 | cyclohexyl | 4 | cyclohexyl-$d_{11}$ bromide | 92.3 | 35 | 99 |
| 3 | cycloheptyl | 5 | cycloheptyl-$d_{13}$ bromide | 98.6 | 16 | 99 |
| 4 | cyclooctyl | 5 | cyclooctyl-$d_{15}$ bromide | 91.0 | 50 | — |
| 5 | cyclododecyl | 1 | cyclododecyl-$d_{23}$ bromide | 40.0 | 80 | — |
| 6 | exo-norbornyl | 3 | exo-norbornyl-$d_{11}$ bromide | 97.8 | 51 | 99[a] |
| 7 | norbornyl | 3 | norbornyl-$d_{11}$ bromide | 95 | 19 | 98 |

[a]The n.m.r. spectrum suggests the presence of 15% endo isomer.

ALCOHOL USED AS STARTING MATERIAL

EXAMPLE 8

Cyclohexyl-$d_{11}$ Bromide

Cyclohexanol (10.01 g.; 0.1 mole) and 20 ml. concentrated deuteriobromic acid (44% in $D_2O$) are refluxed for 20 hours. The reaction mixture then was treated in substantially the same manner as described in Example 1 and the residue obtained subjected to three additional exchanges to provide a 50% yield of cyclohexyl-$d_{11}$ bromide (84 atom % D).

The deuterated acyclic and alicyclic bromides identified in Table II were obtained by following substantially the same procedure described in Example 8 except the cyclohexanol was replaced by an equivalent quantity of the alcohol identified in the following table:

TABLE II

Exchanges of Alkyl Bromides using Alcohols as Starting Materials

| Ex. No. | Alcohol | No. of Exch. | Product | Yield % | Content (% D) |
|---|---|---|---|---|---|
| 9 | 1-phenyl-1-ethanol[①] | 1 | 1-phenyl-1-bromoethane-1,2,2,2-$d_4$ | 61 | 98 |
| 10 | 1,1-diphenyl-1-ethanol[②] | 1 | 1,1-diphenyl-1-bromoethane-2,2,2-$d_3$ | 11 | 94.4 |
| 11 | 2-phenyl-2-propanol | 1 | 2-phenyl-2-bromopropane-1,1,1,3,3,3-$d_6$ | 60 | 90 |
| 12 | cyclododecanol | 3 | cyclododecyl-$d_{23}$ bromide | 43 | 60 |
| 13 | 3-ethyl-3-pentanol | 6 | 3-ethyl-3-bromopentane-$d_{15}$ | 5 | 86.5 |
| 14 | 3-pentanol | 2 | 3-bromopentane-$d_{11}$ | — | 37 |
| 15 | 1-methyl-1-cyclohexanol | 1 | 1-methyl-1-bromocyclhexane-$d_{13}$ | 22 | 94.1 |
| 16 | 1-methyl-1-cyclopentanol | 1 | 1-methyl-1-bromopentanol-$d_{11}$ | 50 | 60 |

①Conditions: 0.1 mole of alcohol, 40 ml. of DBr—$D_2O$ mixture
②Conditions: 0.033 mole of alcohol, 20 ml. of DBr—$D_2O$ mixture

OLEFINS EMPLOYED AS STARTING MATERIALS

EXAMPLE 17

Preparation of Cyclohexyl-$d_{11}$ Bromide

Cyclohexene (8.4 g.; 0.1 mole) and 20 ml. concentrated deuteriobromic acid (44% in $D_2O$) are refluxed for 20 hours. The reaction mixture is worked up in substantially the same manner as described in Example 1 and the residue obtained subjected to 5 additional exchanges to provide a 31.5% yield of cyclohexyl-$d_{11}$ bromide (98.1 atom % D). Gas chromatographic analysis establishes that the product obtained is essentially pure.

EXAMPLE 18

Preparation of norbornyl-$d_{11}$ bromide

Norborene (9.4 g.; 0.1 mole) and 20 ml. concentrated deuteriobromic acid (44% in $D_2O$) are refluxed for 20 hours. The reaction mixture then is worked up in substantially the same manner as described in Example 1 to provide a 14% yield of norbornyl-$d_{11}$ bromide (50 atom % D), and established by chromatographic analysis to be essentially pure.

We claim:
1. A process wherein a mixture consisting of a secondary or tertiary alkyl bromide or a cycloalkyl bromide wherein the bromide atom is attached to the secondary or tertiary carbon atom and at least 10% deuteriobromic acid in deuterium oxide is permitted to react under atmospheric pressure and at a temperature from 0° to about 175°C. for a sufficient number of exchanges to exchange all hydrogens of the secondary or tertiary alkyl bromide or the cycloalkyl bromide by deuterium atoms.
2. A process as claimed in claim 1 wherein a secondary or tertiary alkyl bromide is employed as starting material.
3. A process as claimed in claim 1 wherein the concentration of DBr in $D_2O$ is about 40% and the reaction mixture is heated to reflux.

* * * * *